(12) United States Patent
Eiselt

(10) Patent No.: US 8,879,921 B2
(45) Date of Patent: Nov. 4, 2014

(54) APPARATUS AND A METHOD FOR MODULATION OF AN OPTICAL SIGNAL

(75) Inventor: Michael Eiselt, Kirchheim (DE)

(73) Assignee: Adva Optical Networking SE, Meiningen ot Dreissigacker (DE)

( * ) Notice: Subject to any disclaimer, the term of this patent is extended or adjusted under 35 U.S.C. 154(b) by 222 days.

(21) Appl. No.: 13/149,297

(22) Filed: May 31, 2011

(65) Prior Publication Data

US 2011/0305461 A1 Dec. 15, 2011

(30) Foreign Application Priority Data

Jun. 10, 2010 (EP) .................................. 10165528

(51) Int. Cl.
*H04B 10/00* (2013.01)
*H04B 10/04* (2006.01)
*G02F 1/153* (2006.01)
*G02F 1/01* (2006.01)
*H04B 10/079* (2013.01)
*H04J 14/06* (2006.01)
*H04B 10/516* (2013.01)

(52) U.S. Cl.
CPC ...... *H04B 10/07953* (2013.01); *H04B 10/0799* (2013.01); *H04J 14/06* (2013.01); *H04B 10/516* (2013.01)
USPC ........... 398/152; 398/183; 398/184; 398/198; 359/276; 359/279

(58) Field of Classification Search
CPC ..................... H04B 10/07953; H04B 10/0799; H04B 10/516
USPC .................................................. 398/184, 152
See application file for complete search history.

(56) References Cited

U.S. PATENT DOCUMENTS

| | | | | |
|---|---|---|---|---|
| 5,260,673 | A * | 11/1993 | Pham | 332/103 |
| 8,023,833 | B2 * | 9/2011 | Malouin et al. | 398/202 |
| 8,472,810 | B2 * | 6/2013 | Akiyama et al. | 398/184 |
| 8,565,617 | B2 * | 10/2013 | Nishihara et al. | 398/188 |

(Continued)

FOREIGN PATENT DOCUMENTS

| | | |
|---|---|---|
| EP | 1 612 971 A1 | 1/2006 |
| EP | 1 975 693 A1 | 10/2008 |
| EP | 2 045 935 A2 | 4/2009 |
| WO | WO 2009/036390 A1 | 3/2009 |

OTHER PUBLICATIONS

Pfau et al., "Ultra-Fast Adaptive Digital Polarization Control in a Realtime Coherent Polarization-Multiplexed QPSK Receiver," Optical Fiber Communication/National Fiber Optic Engineers Conference, pp. 1-3 (Feb. 24, 2008).

(Continued)

*Primary Examiner* — Ken Vanderpuye
*Assistant Examiner* — Abbas H Alagheband
(74) *Attorney, Agent, or Firm* — Jenkins, Wilson, Taylor & Hunt, P.A.

(57) ABSTRACT

The invention relates to an apparatus and a method for modulation of an optical signal with a data signal, said apparatus (6) comprising a configurable digital encoding unit (8) encoding data of said data signal to provide an encoded modulation control signal (EMCS), and a signal modulation unit (9) modulating said optical signal with respect to its signal phase and/or signal amplitude in orthogonal polarization directions in response to said encoded modulation control signal (EMCS) to generate a multi-dimensional optical signal vector.

14 Claims, 5 Drawing Sheets

(56) References Cited

U.S. PATENT DOCUMENTS

| | | | |
|---|---|---|---|
| 2004/0146269 A1* | 7/2004 | Levy-Yurista et al. | 385/147 |
| 2004/0223768 A1* | 11/2004 | Shastri et al. | 398/183 |
| 2005/0002676 A1* | 1/2005 | Zitelli | 398/188 |
| 2005/0190827 A1* | 9/2005 | Xu et al. | 375/222 |
| 2007/0058976 A1* | 3/2007 | Tatum et al. | 398/99 |
| 2008/0292322 A1* | 11/2008 | Daghighian et al. | 398/192 |
| 2009/0047026 A1 | 2/2009 | Luo | |
| 2009/0185810 A1* | 7/2009 | Kaplan et al. | 398/184 |
| 2009/0196602 A1 | 8/2009 | Saunders et al. | |
| 2009/0257755 A1* | 10/2009 | Buelow | 398/184 |
| 2009/0274469 A1* | 11/2009 | Yuki et al. | 398/152 |
| 2013/0279913 A1* | 10/2013 | Akiyama et al. | 398/65 |

OTHER PUBLICATIONS

Extended European Search Report for European Application No. 10165528.0 (Nov. 18, 2010).

Roberts et al., "Performance of Dual-Polarization QPSK for Optical Transport Systems," Journal of Lightwave Technology, vol. 27, No. 16, pp. 1-14 (Aug. 15, 2009).

Communication pursuant to Article 94(3) EPC for European Application No. 10 165 528.0 (Jul. 5, 2013).

* cited by examiner

APPARATUS AND A METHOD FOR MODULATION OF AN OPTICAL SIGNAL

PRIORITY CLAIM

This application claims the benefit of European Patent Application No. 10165528.0 filed Jun. 10, 2010, the disclosure of which is incorporated herein by reference.

TECHNICAL BACKGROUND

The invention relates to an apparatus and a method for modulation of an optical signal having an optimized modulation format.

Multilevel modulation formats have recently received more attention, as they allow to transport a larger amount of data with a smaller bandwidth than conventional binary modulation formats. A well known technique is to independently modulate an amplitude of two orthogonal phase components (I and Q phases) of an optical carrier. This is also known as a quadrature amplitude modulation (QAM) having a modulation scheme as shown in FIG. 1. The information content in each phase of a symbol equals the logarithm of base two of the number of amplitude levels. The overall information content equals the sum of the information in both phases.

A further conventional modulation method where the constellation points are located in the I-Q plane is phase modulation. Here, the constellation points are located in a circle around the origin of the plane.

In addition, it is possible and a known technique to modulate an optical carrier which has the same frequency but orthogonal polarization. This conventional method is also called polarization multiplexing.

A measure for the efficiency of a modulation format is the OSNR tolerance of said modulation format for a given bit rate which equals information content per symbol times the symbol rate. With I-Q modulation the best OSNR tolerance is achieved for 4QAM. This OSNR tolerance can be improved by approximately 0.8 dB by using 3-PSK which can be achieved with an I-Q modulator and dependent modulation signals. With conventional polarization multiplexing the bandwidth is reduced by a factor of 2, however twice as much power is required for a constant OSNR and the resulting OSNR tolerance is the same as for single polarization.

Accordingly it is a need to provide a method and an apparatus for modulation of an optical signal which efficiently modulate the optical signal and which provide a high OSNR tolerance.

SUMMARY OF THE INVENTION

The invention provides an apparatus for modulation of an optical signal with a data signal, said apparatus comprising:
 a) a configurable digital encoding unit encoding data of said data signal to provide an encoded modulation control signal;
 b) a signal modulation unit modulating said optical signal with respect to its signal phase and/or signal amplitude in orthogonal polarization directions in response to said encoded modulation control signal to generate a multi-dimensional optical signal vector,
  wherein said digital encoding unit comprises an encoding data storage for storing at least one lookup table.

In an embodiment of the apparatus according to the present invention the apparatus comprises a laser connected to the signal modulation unit, wherein said laser generates an optical signal with a predetermined wavelength.

In an embodiment of the apparatus according to the present invention the apparatus comprises a data interface for receiving said data signal consisting of data words each having a predetermined number of binary data bits from a data source.

In an embodiment of the apparatus according to the present invention the configurable digital encoding unit is connected directly to the signal modulation unit via a control signal bus to apply the encoded modulation control signal to the signal modulation unit.

In an embodiment of the apparatus according to the present invention digital encoding unit comprises a logic circuit performing logic operations on binary data bits of a data word of said data signal received via said data interface.

In an embodiment of the apparatus according to the present invention the each data word of said data signal comprises 1 bit per symbol, 2 bits per symbol, 3 bits per symbol, 4 bits per symbol or 5 bits per symbol.

In an embodiment of the apparatus according to the present invention the encoded modulation control signal comprises four binary control bits forming a constellation point for a four-dimensional optical signal vector generated by said signal modulation unit.

In an embodiment of the apparatus according to the present invention the signal modulation unit comprises Digital-Analog-Converters to convert the encoded modulation control signal into an analogue modulation control signal.

In an embodiment of the apparatus according to the present invention the generated multi-dimensional optical signal vector is transported by an optical transport medium to an optical receiver comprising a demodulator.

In an embodiment of the apparatus according to the present invention a feedback modulation control signal is feedback from said optical receiver to said modulation apparatus for adjusting a configuration of said digital encoding unit depending on a signal quality of the multi-dimensional optical signal vector received by said optical receiver via the optical transport medium.

In an embodiment of the apparatus according to the present invention the feedback modulation control signal is transported in an embedded communication channel.

In an alternative embodiment the feedback modulation control signal is transported in an out of band communication channel.

In a possible embodiment of the apparatus according to the present invention the feedback modulation control signal is derived from a bit error rate detected by the optical receiver.

In an embodiment of the apparatus according to the present invention the feedback modulation control signal controls the digital encoding unit to switch to another encoding lookup table stored in the encoding data storage.

In an embodiment of the apparatus according to the present invention the feedback modulation control signal controls the digital encoding unit to switch logic operations to be performed on binary data bits of a data word of said data signal received via said data interface.

In a possible embodiment of the apparatus according to the present invention the apparatus is a pluggable device, in particular a SFP-, a SFF-, a CFP, or a XFP pluggable device.

The invention further provides a method for modulating of an optical signal with a data signal comprising the steps:
encoding data of the signal according to an encoding scheme to provide an encoded modulation control signal; and
modulating said optical signal with respect to its signal phase and/or signal amplitude in orthogonal polarization directions in response to the encoded modulation control signal to generate a multi-dimensional optical signal vector,
wherein said data encoding scheme is derived from a digital encoding unit that comprises an encoding data storage for storing at least one encoding lookup table.

In an embodiment of the method according to the present invention the encoding scheme is adapted depending on a signal transmission quality of an optical transmission medium.

BRIEF DESCRIPTION OF THE FIGURES

In the following possible embodiments of the apparatus and the method for modulation of an optical signal according to the present invention are described with reference to the enclosed figures.

DETAILED DESCRIPTION OF EMBODIMENTS

Figure 1:
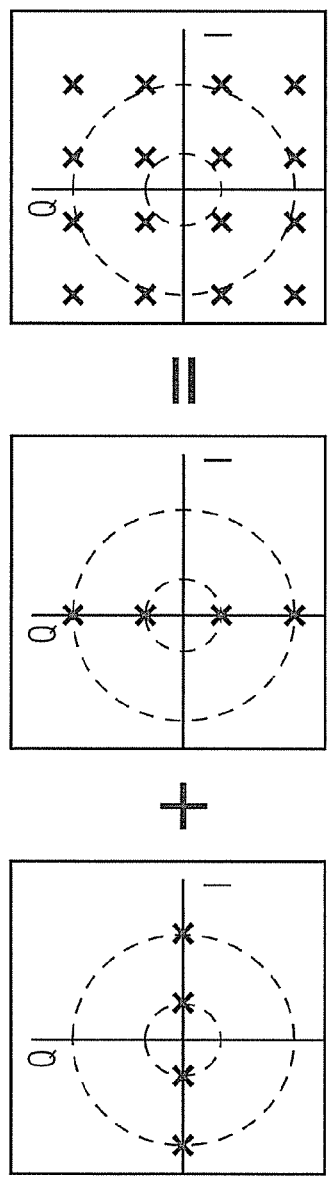
FIG. 1 shows a conventional modulation scheme according to the state of the art.
Figure 2:
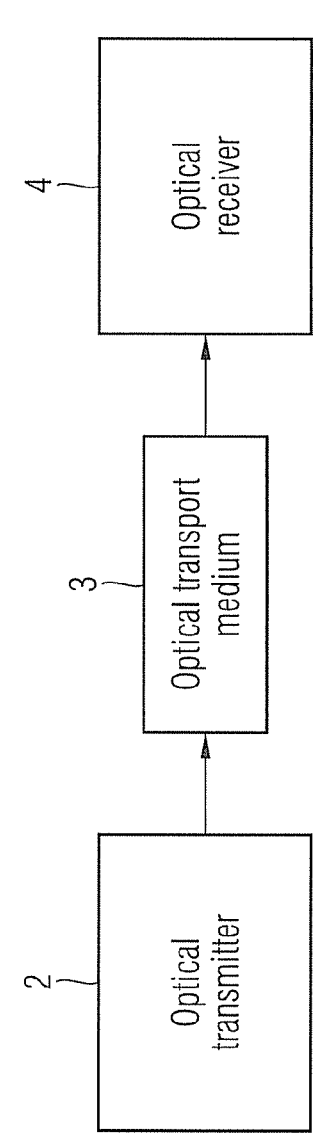
FIG. 2 shows a block diagram of a data transport system comprising an optical transmitter having a modulation apparatus according to the present invention.

As can be seen in FIG. 2 a data transport system 1 comprises an optical transmitter 2 having a modulation apparatus according to the present invention. The optical transmitter 2 transmits a modulated optical signal via an optical transport medium 3 to an optical receiver 4. The optical transport medium 3 can comprise an optical transmission line having one or several optical fibres.

Figure 3:
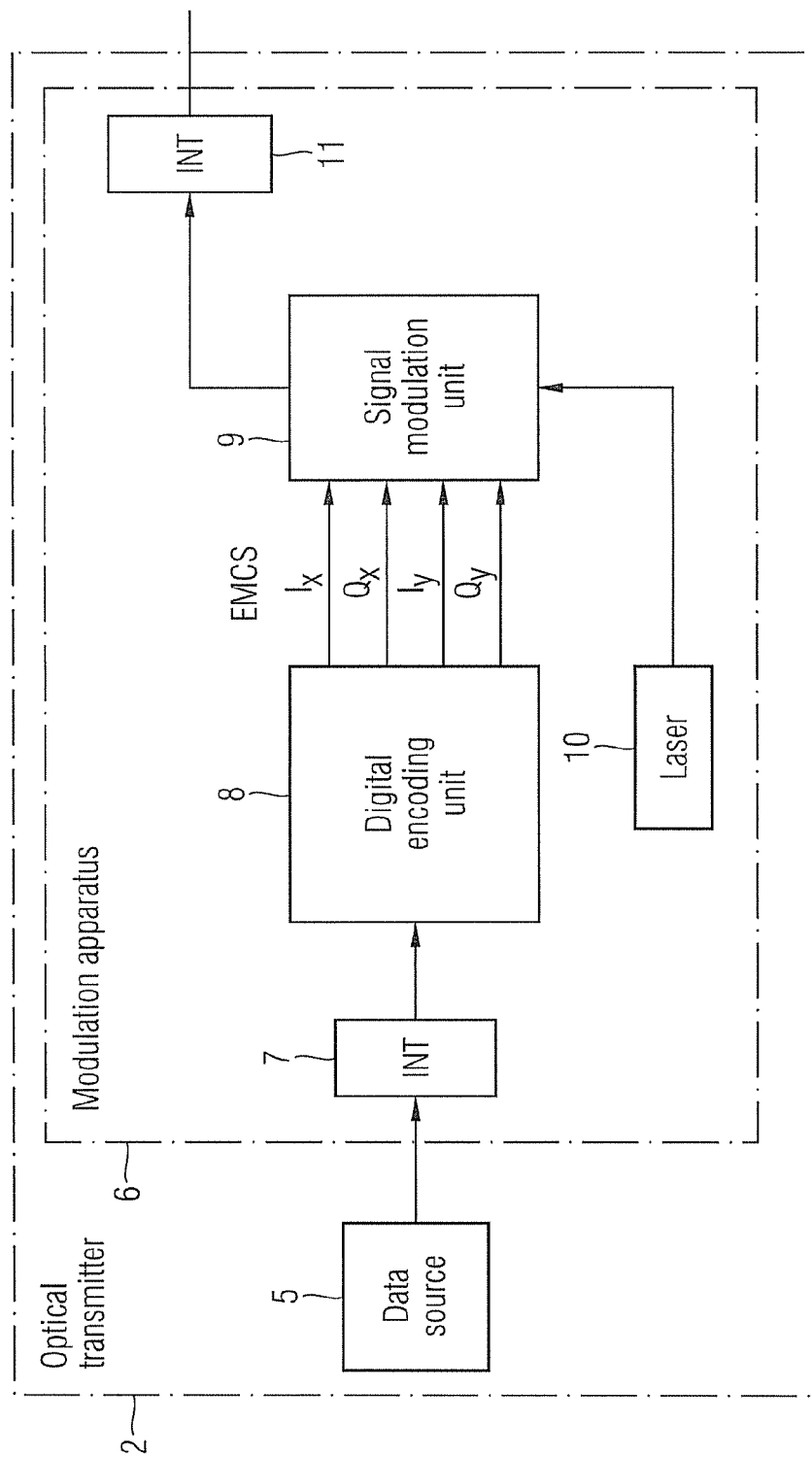
FIG. 3 shows a block diagram of a possible embodiment of an optical transmitter comprising a modulation apparatus according to the present invention.

FIG. 3 shows a block diagram of an optical transmitter 2 having a data source 5 generating a stream of data words or data symbols which are applied to a data interface 7 of a modulation apparatus 6 according to the present invention. The modulation apparatus 6 comprises a configurable digital encoding unit 8 encoding data of the data signal received by means of the data interface 7. The configurable digital encoding unit 8 encodes data according to an encoding scheme to provide an encoded modulation control signal EMCS. The configurable digital encoding unit 8 is connected in the shown embodiment directly to a signal modulation unit 9 via a control signal bus to apply the encoded modulation control signal EMCS to the signal modulation unit 9.

The digital encoding unit 8 comprises a logic circuit performing logic operations on binary data bits of a data word of said data signal received via the data interface 7. The digital encoding unit 8 can comprise an encoding data storage for storing at least one or several encoding lookup tables. The encoded modulation control signal EMCS provided by the digital encoding unit 8 comprises in the shown embodiment four binary control bits forming a constellation point for a four-dimensional optical signal vector generated by the signal modulation unit 9. The signal modulation unit 9 modulates an optical signal received from an optical signal source with respect to its signal phase and/or signal amplitude in orthogonal polarization directions in response to the encoded modulation control signal EMCS to generate a multidimensional optical signal vector. In the embodiment shown in FIG. 3 the modulation apparatus 6 comprises a laser 10 connected to the signal modulation unit 9. The laser 10 generates an optical signal with at least one predetermined wavelength ($\lambda$) which is modulated by the signal modulation unit 9 in response to the encoded modulation control signals EMCS. The generated multi-dimensional optical signal vector generated by the signal modulation unit 9 is transported by the optical transport medium 3 to the optical receiver 4. As can be seen in FIG. 3 the signal modulation unit 9 applies the generated multi-dimensional optical signal vector via an optical interface 11 to the optical transport medium 3 shown in FIG. 2.

Figure 4:
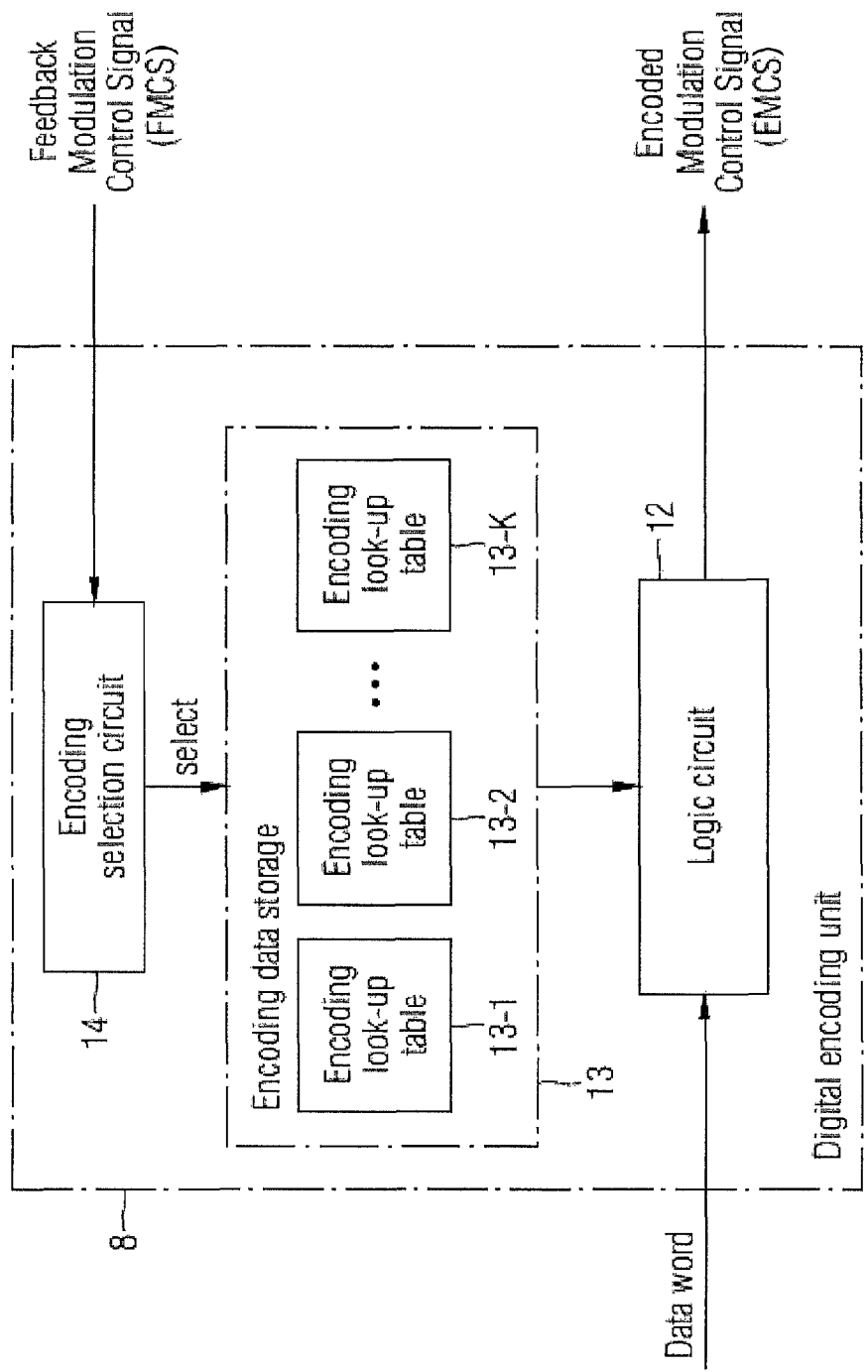
FIG. 4 shows a block diagram of a possible embodiment of a digital encoding unit within a modulation apparatus according to the present invention.

FIG. 4 shows a block diagram of a possible embodiment of the digital encoding unit 8 within the modulation apparatus 6. The digital encoding unit 8 comprises a logic circuit 12 performing logic operations on binary data bits of a data word or data symbol of the data signal received via the data interface 7 of the modulation apparatus 6. The data signal consists of data words each having a predetermined number of binary data bits. The logic circuit 12 performs encoding of the received data signal. Each data word can comprise a different number of data bits per symbol. The digital encoding unit 8 comprises in the shown embodiment an encoding data storage 13 for storing several encoding lookup tables 13-1, 13-2, 13-$k$. Furthermore, the digital input unit 8 comprises an encoding selection circuit 14 which can select an encoding scheme stored in one of the encoding lookup tables 13-$i$ in response to a feedback modulation control signal FMCS. The feedback modulation control signal FMCS is feedback from the optical receiver 4 to the modulation apparatus 6 for adjusting the configuration of the digital encoding unit 8 depending on a signal quality of the multi-dimensional optical signal vector received by the optical receiver 4 via the optical transport medium 3. In a possible embodiment the feedback modulation control signal FMCS is transported in an embedded communication channel ECC. In an alternative embodiment the feedback modulation control signal FMCS is transported from the optical receiver 4 to the optical transmitter 2 in an out of band (OoB) communication channel, e.g. via a separate network. In a possible embodiment the feedback modulation control signal FMCS is derived from a bit error rate BER detected by the optical receiver 4. In a possible embodiment the feedback modulation control signal FMCS controls the digital encoding unit 8 to switch to another encoding lookup table stored in the encoding data storage 13. The feedback modulation control signal FMCS controls the digital encoding unit 8 to switch logic operations to be performed on binary data bits of a data word of the received data signal. The switch over can be performed in a possible embodiment during data transport operation, i.e. on the fly. In an alternative embodiment the FMCS signal is generated by the receiver 4 in regular time intervals. This time interval can be adjustable depending on a security level of an application or depending on control data supplied to the receiver 4, e.g. in the transported data stream or by a control device or by a user via a user interface of the optical transmitter 3 or of the receiver 4.

Depending on the quality of the data transmission medium 3, e.g. an optical data transmission line, the modulation format can be adapted by the modulation apparatus 6. Keeping the symbol rate of the data signal constant the transmitted data rate can be varied. For a poor or defect transmission line, e.g. due to low optical signal to noise ratio (OSNR), the number of constellation points is reduced and therefore also the number of bits which are transmitted in one data symbol. Vice versa, when the optical transmission line 3 has a good quality, the number of constellation points is increased enabling the transport of more bits per data symbol. This adaption of the modulation format is done by modifying the encoding within the digital encoding unit 8. The adaption of the number of constellation points is performed in a preferred embodiment dynamically during data transport from optical transmitter 2 to optical receiver 4.

There are two possible embodiments for the interface between the digital encoding unit 8 and the signal modulation unit 9.

In a first possible embodiment digital (binary) data as output from a lookup table are directly provided to the interface. These data can take after appropriate amplification and a AC-coupling the values of +1 or −1 or, in terms of modulator voltages, $+V_p$ or $-V_{pi}$, wherein $V_{pi}$ is the voltage swing required at an optical modulator of the signal modulation unit 9 to switch between full transparency and full blocking of the modulator.

In an alternative second embodiment four data words of m parallel lines each determine the four modulation voltages $I_x$, $I_y$, $Q_x$, $Q_y$. In the signal modulation unit 9 the parallel control words of the EMCS are converted in four m bit Digital-to-Analog-Converters DAC into voltages between $+V_{pi}$ and $-V_{pi}$. Thus, the modulators of the signal modulation unit 9 can receive any of multiple voltage levels between these two limiting voltages. In this embodiment additional DA converters are required operating at the symbol rate. The advantage of this embodiment is that more different constellation points can be set. Furthermore, this embodiment can also be used to set the subset of voltage levels as in the first embodiment.

With the first embodiment comprising binary modulator control voltages a flexible encoding of 2, 8 or 16 constellation points is possible. In this way 1, 3 or 4 bits are transmitted per symbol. Examples for the respective encoding tables stored in the encoding data storage 13 of the digital encoding unit 8 are shown in the following tables.

In a possible embodiment 1 bit per symbol is encoded with binary control signals.

TABLE 1

| data | Ix | Iy | Qx | Qy |
|---|---|---|---|---|
| 0 | −1 | −1 | −1 | −1 |
| 1 | +1 | +1 | +1 | +1 |

In a further possible embodiment 3 bits per data symbol are encoded with binary control signals.

TABLE 2

| data | Ix | Iy | Qx | Qy |
|---|---|---|---|---|
| 000 | −1 | −1 | −1 | −1 |
| 001 | −1 | −1 | +1 | +1 |
| 010 | −1 | +1 | −1 | +1 |
| 011 | −1 | +1 | +1 | −1 |
| 100 | +1 | −1 | −1 | +1 |
| 101 | +1 | −1 | +1 | −1 |
| 110 | +1 | +1 | −1 | −1 |
| 111 | +1 | +1 | +1 | +1 |

In a further possible embodiment 4 bits per data symbol are encoded with binary control signals.

TABLE 3

| data | Ix | Iy | Qx | Qy |
|---|---|---|---|---|
| 0000 | −1 | −1 | −1 | −1 |
| 0001 | −1 | −1 | −1 | +1 |
| 0010 | −1 | −1 | +1 | −1 |
| 0011 | −1 | −1 | +1 | +1 |
| 0100 | −1 | +1 | −1 | −1 |
| 0101 | −1 | +1 | −1 | +1 |
| 0110 | −1 | +1 | +1 | −1 |
| 0111 | −1 | +1 | +1 | +1 |
| 1000 | +1 | −1 | −1 | −1 |
| 1001 | +1 | −1 | −1 | +1 |
| 1010 | +1 | −1 | +1 | −1 |
| 1011 | +1 | −1 | +1 | +1 |
| 1100 | +1 | +1 | −1 | −1 |
| 1101 | +1 | +1 | −1 | +1 |
| 1110 | +1 | +1 | +1 | −1 |
| 1111 | +1 | +1 | +1 | +1 |

A key parameter for the modulation constellations is the noise tolerance T. The noise tolerance T is defined by the ratio of the square of the minimum distance between constellation points and the average power. The larger the noise tolerance T the more noise is tolerated for a given bit error rate BER and the lower the transmission line quality can be:

$$T = \frac{D_{min}^2}{P_{avg}}$$

The minimum distance $D_{min}$ can be defined as:

$$D_{min}^2 = \min_{(i,j)} \lfloor (I_x(i) - I_x(j))^2 + (I_y(i) - I_y(j))^2 + (Q_x(i) - Q_x(j))^2 + (Q_y(i) - Q_y(j))^2 \rfloor$$

$$i \neq j$$

The average power for N constellation points is:

$$P_{avg} = \frac{1}{N} \sum_i [I_x^2(i) + I_y^2(i) + Q_x^2(i) + Q_y^2(i)]$$

The average power $P_{avg}$ can be four in all cases for binary modulation. The resulting values for the noise tolerance T for 1, 3 and 4 bits per symbol yield T=4, 2, and 1, respectively.

For 2 bits per symbol a subset of the 3 bits/symbol encoding table (Table 2) can be used. In this case a noise tolerance T=2 is still valid. In this embodiment no improvement for the noise tolerance can be obtained by reducing the bit rate.

When DA convertors are employed in the signal modulation unit 9 the modulation voltages can assume any value between −1 and +1 when the Digital-Analog-Converters DAC have a sufficient resolution. In this case optimum constellations for other values of bits/symbol can be achieved. Table 4 below shows as an example the modulation voltage for a 2 bit/symbol encoding scheme. Here is the average power $P_{avg}$ is 1 and $D_{min}^2$ is =8/3. Therefore the noise tolerance T is in this example T=2,67.

TABLE 4

| data | Ix | Iy | Qx | Qy |
|------|-----|------|------|----|
| 00 | 0 | 0 | 1 | 0 |
| 01 | +√8/3 | 0 | -1/3 | 0 |
| 10 | -√2/3 | -√6/3 | -1/3 | 0 |
| 11 | -√2/3 | +√6/3 | -1/3 | 0 |

In a possible embodiment 5 bits are encoded with the following encoding scheme. In the given example the average power $P_{avg}$ is 2,375 and $D^2_{min}$ is 2 corresponding to a noise tolerance T=0,842.

TABLE 5

| data | Ix | Iy | Qx | Qy |
|-------|----|----|----|----|
| 00000 | -1 | -1 | -1 | -1 |
| 00001 | -1 | -1 | -1 | +1 |
| 00010 | -1 | -1 | 0  | 0  |
| 00011 | -1 | -1 | +1 | -1 |
| 00100 | -1 | -1 | +1 | +1 |
| 00101 | -1 | 0  | -1 | 0  |
| 00110 | -1 | 0  | 0  | -1 |
| 00111 | -1 | 0  | 0  | +1 |
| 01000 | -1 | 0  | +1 | 0  |
| 01001 | -1 | +1 | -1 | -1 |
| 01010 | -1 | +1 | -1 | +1 |
| 01011 | -1 | +1 | 0  | 0  |
| 01100 | -1 | +1 | +1 | -1 |
| 01101 | 0  | -1 | -1 | 0  |
| 01110 | 0  | -1 | 0  | -1 |
| 01111 | 0  | -1 | 0  | +1 |
| 10000 | 0  | -1 | +1 | 0  |
| 10001 | 0  | 0  | -1 | -1 |
| 10010 | 0  | 0  | -1 | +1 |
| 10011 | 0  | 0  | 0  | 0  |
| 10100 | 0  | 0  | +1 | -1 |
| 10101 | 0  | 0  | +1 | +1 |
| 10110 | 0  | +1 | -1 | 0  |
| 10111 | 0  | +1 | 0  | -1 |
| 11000 | 0  | +1 | 0  | +1 |
| 11001 | 0  | +1 | +1 | 0  |
| 11010 | +1 | -1 | 0  | 0  |
| 11011 | +1 | 0  | -1 | 0  |
| 11100 | +1 | 0  | 0  | -1 |
| 11101 | +1 | 0  | 0  | +1 |
| 11110 | +1 | 0  | +1 | 0  |
| 11111 | +1 | +1 | 0  | 0  |

For other values of transmitted bits per symbol appropriate encoding tables or encoding schemes can be provided. For a best performance, the value of the noise tolerance T can be maximised when selecting a corresponding encoding table stored in the encoding data storage 13 of the digital encoding unit 8 shown in FIG. 4. Generally $2^M$ distinct constellation points are provided to encode M bits into a symbol.

In a further possible embodiment a non-integer number of bits per symbol can be encoded. This can be achieved by combining multiple symbols for an integer number of bits which is multiple of the non-integer number of bits per symbol. For instance, if 2,5 bits per symbols are to be encoded a pair of two symbols can be used to transmit 5 bits. To achieve this $2^{2,5}$~6 constellation points are required.

Figure 5:
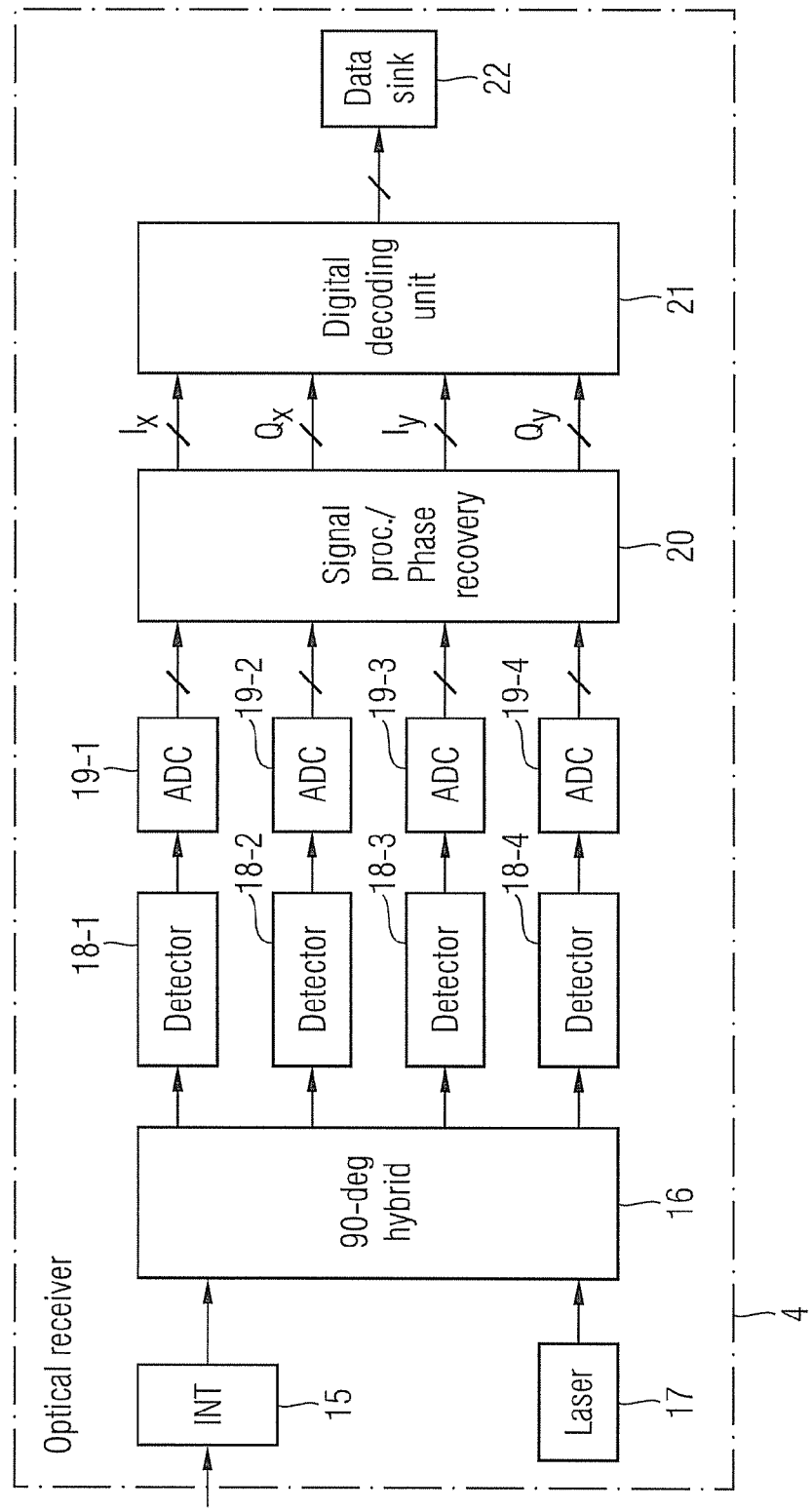
FIG. 5 shows a block diagram of a possible embodiment of an optical receiver of a data transport system according to the present invention.

FIG. 5 shows a block diagram of a possible embodiment of an optical receiver 4 as employed in a digital data transport system 1 according to the present invention. The optical receiver 4 comprises an optical interface 15 for receiving the modulated optical signal from the optical transmitter 2 via the optical transport medium 3. The received optical signal is applied to a 90-deg hybrid circuit 16 which receives an optical signal from a local laser 17. The demodulated signal is applied to detectors 18-1, 18-2, 18-3, 18-4. The output signals of the detectors 18-*i* are applied to corresponding analog digital converters 19-1, 19-2, 19-3, 19-4 which apply the converted digital signal to a signal processing and phase recovery circuit 20. The output signals of the signal processing and phase recovering circuit 20 are supplied to a digital decoding unit 21 connected to a data sink 22 for processing the received data.

Figure 6:
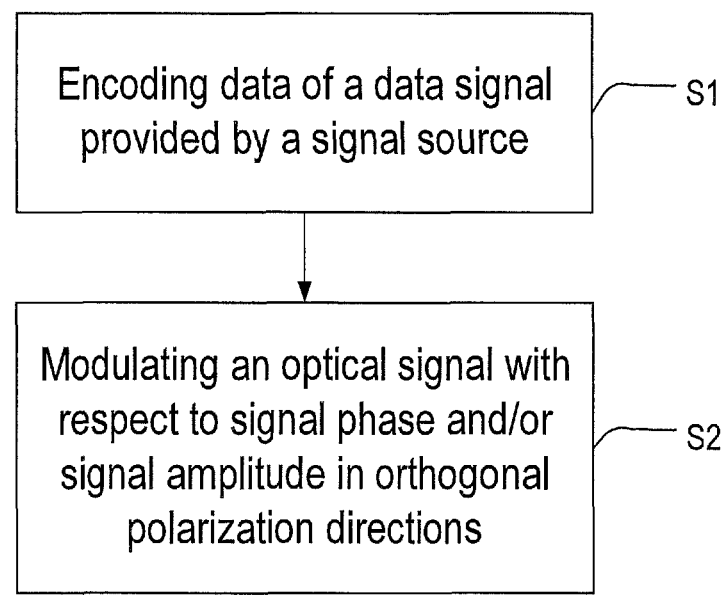
FIG. 6 shows a flowchart of a possible embodiment of a method for modulating an optical signal according to the present invention.

FIG. 6 shows a flowchart in a possible embodiment of a method for modulation of an optical signal according to the present invention.

In a first step S1 data of a data signal provided by a signal source is encoded according to an encoding scheme to provide an encoded modulation control signal EMCS.

In a further step S2 an optical signal is modulated with respect to its signal phase and/or signal amplitude in orthogonal polarization directions in response to the encoded modulation control signal EMCS to generate a multidimensional signal vector.

The encoding scheme used in step S1 is adapted in a preferred embodiment depending to a signal transmission quality of the optical transport medium 3. This signal transmission quality can be derived from the signal quality of the multidimensional optical signal vector received by the optical receiver 4. In a possible embodiment the optical receiver 4 as shown in FIG. 5 can comprise a detection unit which detects the bit error rate of a signal applied to the data sink 22. This detection circuit can derive a feedback modulation control signal FMCS from the detected or measured bit error rate BER. This feedback modulation control signal FMCS can be transported in a possible embodiment in an embedded communication channel ECC via the optical transport medium 3 back to the optical transmitter 2 and can form a control signal for the encoding selection circuit 14 within the digital encoding unit 8 of the modulation apparatus 6. In an alternative embodiment the feedback modulation control signal FMCS is sent by the optical receiver 4 to the transmitter 2 in an out of band communication channel, for example via a separate data network.

With the modulation apparatus 6 according to the present invention as shown in FIG. 3 it is possible to combine the modulation signals to all individual amplitude modulations for both phases I an Q in both polarizations x and y. There are four modulation signals $I_x$, $Q_x$, $I_y$ and $Q_y$ which take values depending on the data to be transmitted. Accordingly, each point in the four-dimensional ($I_x$-$Q_x$, $I_y$-$Q_y$) space can be a constellation point and the modulation constellation is optimized accordingly, for instance to yield optimum OSNR tolerance. For example using a four-dimensional AM/4d AM) with 8 constellation points an OSNR tolerance can be achieved which is 1,76 dB better than for conventional 4-QAM. For this exemplary modulation format the constellation points are located on a surface of a four-dimensional sphere. The optimal constellation points can be adjusted by maximising the minimum distance between all pairs of constellation points.

With the modulation apparatus and method according to the present invention it is possible to expand a range or a reach for a given data rate thus allowing to transport optical data for a given data rate over a longer distance. The modulation apparatus according to the present invention enables an optimum distribution of the constellation points in the four-dimensional space of I and Q phases in x and y polarizations to yield an optimum OSNR tolerance. By a combined modulation of both polarizations more constellation points can be addressed and the modulation is optimized.

With the modulation apparatus 6 according to the present invention a variety of modulation formats can be achieved using four-dimensional amplitude modulation or having more flexibility in adjusting the modulation constellation. In a possible embodiment the modulation apparatus 6 is integrated in an optical transmitter 2. In a further possible embodiment the modulation apparatus 6 is pluggable device which can be plugged into an optical transmitter 2. The pluggable device can be a SFP-, a SFF-, a CFP, a XFP pluggable device.

The invention claimed is:

1. An apparatus for modulation of an optical signal with a data signal, said apparatus comprising:
   (a) a configurable digital encoding unit adapted to encode data of said data signal to provide an encoded modulation control signal; and
   (b) a signal modulation unit adapted to modulate said optical signal with respect to its signal phase and/or signal amplitude in orthogonal polarization directions in response to said encoded modulation control signal, the signal modulation unit adapted to generate a four-dimensional optical signal vector,
   wherein said digital encoding unit comprises:
   an encoding data storage for storing at least two encoding lookup tables;
   wherein said encoded modulation control signal comprises four binary control bits, and wherein said four binary control bits form a constellation point for a four-dimensional optical signal vector generated by said signal modulation unit;
   wherein the generated four-dimensional optical signal vector is transported by an optical transport medium to an optical receiver comprising a demodulator; and
   wherein a feedback modulation control signal is feedback from said optical receiver to said modulation apparatus for selecting an encoding scheme by switching the digital encoding unit to another encoding lookup table depending on a signal quality of the four-dimensional optical signal vector received by said optical receiver via said optical transport medium.

2. The apparatus according to claim 1,
   wherein said apparatus further comprises a laser connected to said signal modulation unit, wherein said laser is adapted to generate an optical signal with a predetermined wavelength.

3. The apparatus according to claim 1,
   wherein said apparatus further comprises a data interface for receiving said data signal, wherein said data signal comprises data words, each having a predetermined number (m) of binary data bits from a data source.

4. The apparatus according to claim 1,
   wherein said configurable digital encoding unit is connected directly to said signal modulation unit via a control signal bus and is adapted to apply the encoded modulation control signal to said signal modulation unit.

5. The apparatus according to claim 1,
   wherein the digital encoding unit comprises a logic circuit performing logic operations on binary data bits of a data word of said data signal received via said data interface.

6. The apparatus according to claim 1,
   wherein each data word of said data signal comprises at least one of 1 bit per symbol, 2 bits per symbol, 3 bits per symbol, 4 bits per symbol or 5 bits per symbol.

7. The apparatus according to claim 1,
   wherein said signal modulation unit comprises Digital-Analog-Converters adapted to convert the encoded modulation control signal into an analogue modulation control signal.

8. The apparatus according to claim 1,
   wherein said feedback modulation control signal is transported in an embedded communication channel or an out of band communication channel.

9. The apparatus according to claim 1,
   wherein said feedback modulation control signal is derived from a bit error rate detected by said optical receiver.

10. The apparatus according to claim 9,
    wherein said feedback modulation control signal controls said digital encoding unit to switch to another encoding lookup table stored in said encoding data storage.

11. The apparatus according to claim 10,
    wherein said feedback modulation control signal is adapted to control said digital encoding unit to switch logic operations to be performed on binary data bits of a data word of said data signal received via said data interface.

12. The apparatus according to claim 1,
    wherein said apparatus is a pluggable device comprising a SFP-, a SFF-, a CFP, a XFP pluggable device.

13. A method for modulation of an optical signal with a data signal comprising the steps of
    (a) encoding data of said data signal according to an encoding scheme to provide an encoded modulation control signal; and
    (b) modulating said optical signal with respect to its signal phase and/or signal amplitude in orthogonal polarization directions in response to said encoded modulation control signal to generate a four-dimensional optical signal vector,
    wherein said data encoding scheme is derived from a digital encoding unit that comprises an encoding data storage for storing at least two encoding lookup tables;
    wherein said encoded modulation control signal comprises four binary control bits, and wherein said four binary control bits form a constellation point for a four-dimensional optical signal vector generated when modulating said optical signal;
    wherein the generated four-dimensional optical signal vector is transported by an optical transport medium to an optical receiver comprising a demodulator; and
    wherein a feedback modulation control signal is feedback from said optical receiver to said modulation apparatus for selecting an encoding scheme by switching the digital encoding unit to another encoding lookup table depending on a signal quality of the four-dimensional optical signal vector received by said optical receiver via said optical transport medium.

14. The method according to claim 13,
    wherein said encoding scheme is adapted depending on a signal transmission quality of an optical transport medium.

* * * * *